US012544800B2

(12) United States Patent
Blanc

(10) Patent No.: US 12,544,800 B2
(45) Date of Patent: Feb. 10, 2026

(54) METHOD FOR ADJUSTING AT LEAST ONE PARAMETER OF A LINE FOR SORTING OBJECTS SUCH AS FRUIT OR VEGETABLES, AND ASSOCIATED SORTING SYSTEM

(71) Applicant: MAF AGROBOTIC, Montauban (FR)

(72) Inventor: Philippe Blanc, Montauban (FR)

(73) Assignee: MAF AGROBOTIC, Montauban (FR)

( * ) Notice: Subject to any disclaimer, the term of this patent is extended or adjusted under 35 U.S.C. 154(b) by 0 days.

(21) Appl. No.: 18/274,163

(22) PCT Filed: Jan. 26, 2022

(86) PCT No.: PCT/FR2022/050146
§ 371 (c)(1),
(2) Date: Jul. 25, 2023

(87) PCT Pub. No.: WO2022/162313
PCT Pub. Date: Aug. 4, 2022

(65) Prior Publication Data

US 2025/0001461 A1 Jan. 2, 2025

(30) Foreign Application Priority Data

Jan. 27, 2021 (FR) .................................... 2100761

(51) Int. Cl.
*B07C 5/36* (2006.01)

(52) U.S. Cl.
CPC .......... *B07C 5/36* (2013.01); *B07C 2501/009* (2013.01)

(58) Field of Classification Search
CPC ................ B07C 5/36; B07C 2501/009; B65G 2203/0283

(Continued)

(56) References Cited

U.S. PATENT DOCUMENTS 3,980,180 A * 9/1976 Jamieson ................ B07C 5/368 209/912
4,254,877 A * 3/1981 Rose ......................... B07C 5/18 209/912

(Continued)

FOREIGN PATENT DOCUMENTS

EP 0060013 9/1982
KR 101686617 B1 * 12/2016 ............... B07C 5/16

OTHER PUBLICATIONS

Kim; Bae Ho; "System for Packaging Fruits" (English Translation), Dec. 14, 2016, worldwide.espacenet.com (Year: 2016).*

(Continued)

*Primary Examiner* — Molly K Devine
(74) *Attorney, Agent, or Firm* — IPSILON USA, LLP

(57) ABSTRACT

The invention relates to a method for adjusting at least one parameter of a line (1) for sorting objects (7) of a system for packing such objects belonging to the group comprising fruit and vegetables, the sorting line (1) conveying a plurality of supports (6), each support (6) being intended to carry an object (7), the adjustment method being characterised in that it comprises the following steps: —moving at least one support (6) in a longitudinal direction of travel (5) of the sorting line (1); —detecting the passage of said at least one support (6) in front of a reference point (11) of the sorting line (1); —detecting the passage of said at least one support (6) in front of each discharging station Pi (12, 12') of a plurality of discharging stations distributed along the sorting line (1), each discharging station Pi (12, 12') being intended to be able to discharge an object (7) from said at least one support (6) that is carried by said at least one support (6) when said at least one support (6) passes in front of said discharging station Pi (12, 12'); —determining each longitudinal distance Di separating each discharging station Pi (12, 12') of the plurality of discharging stations and the (Continued)

reference point (11), on the basis of data for detecting the passage of said at least one support (6) in front of the reference point (11) and data for detecting the passage of said at least one support (6) in front of each discharging station Pi (12, 12') and the drive speed of said at least one support (6) on the sorting line (1). The invention also relates to a system for sorting such objects and to a system for packing objects comprising such a sorting system.

19 Claims, 3 Drawing Sheets

(58) Field of Classification Search
USPC .................................................. 209/509, 606
See application file for complete search history.

(56) References Cited

U.S. PATENT DOCUMENTS 4,262,807 A * 4/1981 Leverett .................. B07C 5/342 209/592
5,267,654 A * 12/1993 Leverett ............... B65G 47/965 209/912
5,513,740 A * 5/1996 Affeldt ................. B65G 47/846 198/460.1

OTHER PUBLICATIONS

International Search Report dated Apr. 20, 2022.

* cited by examiner

[Fig. 1]
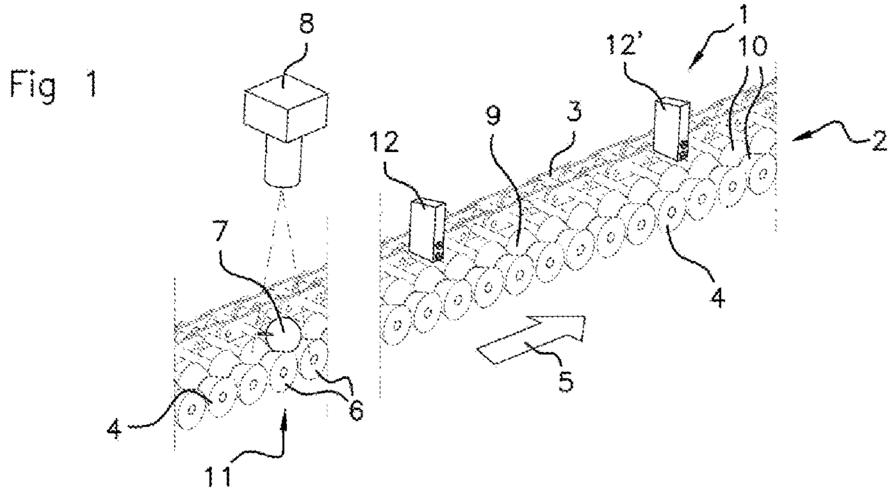
[Fig. 2]
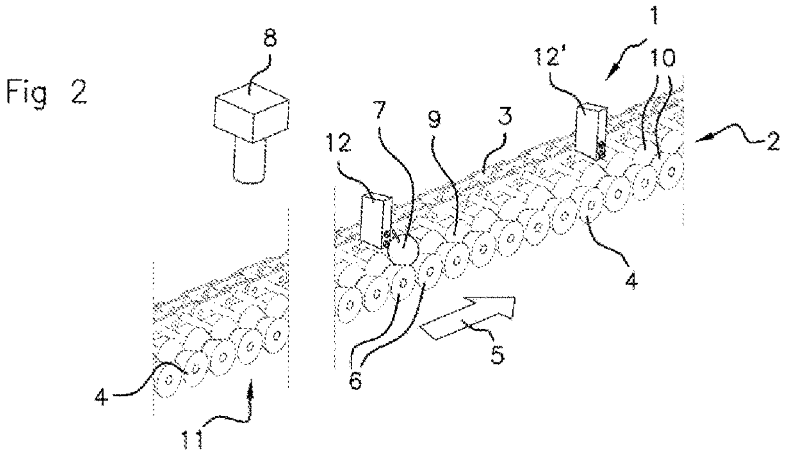
[Fig. 3]
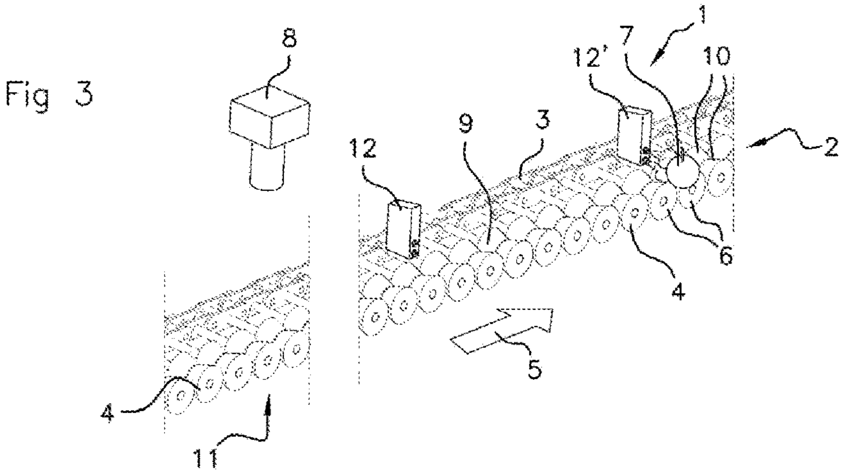

METHOD FOR ADJUSTING AT LEAST ONE PARAMETER OF A LINE FOR SORTING OBJECTS SUCH AS FRUIT OR VEGETABLES, AND ASSOCIATED SORTING SYSTEM

RELATED APPLICATION

This application is a National Phase of PCT/FR2022/050146 filed on Jan. 26, 2022, which claims the benefit of priority from French Patent Application No. 21 00761 filed on Jan. 27, 2021, the entirety of which are incorporated by reference.

FIELD OF THE INVENTION

The present invention relates to a method for adjusting at least one parameter of a line for sorting objects such as fruit or vegetables, an associated sorting system and a system for packaging objects comprising such a sorting system.

DESCRIPTION OF RELATED ART

Systems are known for sorting objects selected from the group made up of fruit and vegetables, which are transported on a conveyor line. Such a conveyor line comprises a plurality of holders which are driven in a longitudinal forward movement by means of a chain. The objects, in particular small objects, are each carried by a holder which moves along the conveyor line, first passing in front of a device—in particular a camera—for analyzing at least one sorting criterion, the analysis device being fixed and constituting a reference point for the position of each object on the conveyor line and, subsequently, in front of one or more discharge stations arranged downstream of the analysis device. Each of the discharge stations is fixed with respect to the conveyor line and comprises one or more discharge nozzles for discharging the object from its holder when said object reaches the discharge station where it is to be discharged. Each object is discharged from the sorting line at an object discharge station from which all the objects conveyed on the conveyor line and having the same sorting criterion are discharged. Thus, the objects discharged at one same discharge station form a batch of objects, all the objects of this batch meeting the same sorting criterion. These may be objects with the same weight value (or a weight value within the same range of weight values), the same caliber (or a caliber value within the same range of caliber values), the same defined external appearance, such as color for example, the same sugar content (or a sugar content value within the same range of sugar content values), the same level of ripeness, the same firmness (or a firmness value within the same range of firmness values), the occurrence of the same defect, etc.

In general, in order to be able to move an object conveyed by a holder out of this holder at the precise moment when it passes in front of an ejection station predefined on the basis of a sorting criterion, it is necessary to know as precisely as possible the position of each holder on the conveyor line relative to each ejection station. Since the speed of longitudinal movement of the holders on the conveyor line is known, it is necessary to know precisely the distance between each ejection station and the analysis device.

In particular, in order to be able to discharge the object from its holder at the precise moment when it passes in front of a discharge nozzle of a discharge station predefined on the basis of the sorting criterion, it is necessary to know as precisely as possible the position of each holder on the conveyor line relative to each discharge nozzle of each discharge station. Since the speed of longitudinal movement of the holders on the conveyor line is known, it is necessary to know precisely the distance between each discharge nozzle of each discharge station and the analysis device.

However, depending on the conditions of use of the conveyor line, in particular wear and distension of the drive chain of the conveyor line, it is possible for the distance between the analysis device and at least one discharge station to vary, such that the object discharge nozzle(s) of at least one discharge station is (are) activated when the object is not positioned in line with the discharge nozzle, but upstream of the discharge nozzle or downstream of the discharge nozzle. As a result, discharging is not carried out properly.

These days, these various distances are established in increments of forward travel of the chain, the increments of forward travel being defined by an encoder associated with the chain. These distances are measured in increments and manually entered into the object discharge control system. These operations take a considerable amount of time. During this time, the sorting line and the packaging system are unavailable. This results in a fall in productivity. These operations require qualified personnel to carry out said measurements. This results in a fall in profitability.

The invention aims to overcome these drawbacks.

Furthermore, as soon as an event likely to modify at least one of the distances between a discharge nozzle and the camera occurs on the sorting line, the distance or distances concerned by this event must be measured again and the measurements entered manually once again into the aforementioned system. In this case too, these operations are time consuming for system users.

Objects and Summary

In view of the foregoing, it would therefore be advantageous to be able to measure more quickly than before—in particular automatically—the distances between a reference point and object removal stations—in particular various discharge stations—located on an object sorting line.

It would also be advantageous to be able to measure the distances between a reference point and the various discharge stations located on an object sorting line, automatically and in particular each time the conveyor line is started up.

The invention aims to solve these problems.

The invention therefore aims to propose an automated method for adjusting at least one parameter of a line for sorting objects of a system for packaging such objects belonging to the group of fruit and vegetables.

To this end, the present invention relates to a method for adjusting at least one parameter of a line for sorting objects of a system for packaging such objects belonging to the group of fruit and vegetables, the sorting line conveying a plurality of holders, each holder being intended to carry an object;

the adjustment method being characterized in that it comprises the following steps:

- driving at least one holder such that it moves in a longitudinal direction of forward travel of the sorting line;
- detecting the passage of said at least one holder in front of a reference point of the sorting line;
- detecting the passage of said at least one holder in front of each discharge Pi station of a plurality of discharge stations arranged along the sorting line, each discharge Pi station being intended to be able to eject, from said at least one holder, an object carried by said at least one holder, as said at least one holder passes in front of said discharge Pi station;

determining each longitudinal distance Di between each discharge Pi station of the plurality of discharge stations and the reference point, on the basis of data concerning detection of the passage of said at least one holder in front of the reference point and data concerning detection of the passage of said at least one holder in front of each discharge Pi station and the speed V at which said at least one holder is driven on the sorting line.

Throughout the text, the expression "sorting line" designates an object conveyor line for grouping together similar objects meeting at least one same sorting criterion from a set of heterogeneous objects, but it also designates a conveyor line for distributing in space similar objects—if necessary pre-sorted—from a homogeneous set of objects meeting at least one same sorting criterion.

This method makes it possible to very simply determine the longitudinal distances Di between each of the discharge stations and the reference point on the sorting line, simply on the basis of passage of an object holder on the sorting line. It makes it possible to synchronize the activation of the means for ejecting objects from the object sorting line and the passage of the holders for said objects on the sorting line. The detection of the passage of the object holder at the reference point and at each discharge station is carried out automatically, that is to say without human intervention, and the same is true for the determination of the various distances, which is for its part generally carried out by a data processing unit or processor, which represents a saving of precious time for the personnel working on the line in terms of manual intervention. The adjustment of one or more parameters of the conveyor line is therefore carried out much more quickly than in the prior art. As a result, the operator of the sorting line may carry out such an adjustment more frequently than before and for example at regular time intervals, in particular when restarting the sorting line and/or the object packaging system.

The method according to the invention makes it possible, for example when the object sorting facility is started up, to analyze the distances between a reference point of the sorting line and each discharge station on this sorting line.

The method according to the invention allows the activation of the discharge station to be perfectly synchronized with the passage of the holder carrying each object having the sorting criterion corresponding to this ejection station, whereby all the objects having a common sorting criterion or a sorting criterion within the same range of values, and only these objects, are ejected from the sorting line at the same sorting station upstream of which they are grouped into batches.

Advantageously and according to the invention, the adjustment method is automated.

According to other possible features:

the passage of said at least one holder in front of each discharge station is detected by electromagnetic interaction between the fixed discharge Pi station and said at least one object holder moving on the sorting line when said at least one object holder passes in front of the discharge Pi station; there is thus no contact between the object holder and the discharge station, and detection of the passage is carried out automatically as the holder advances along the sorting line, when it reaches the discharge station in question;

the passage of said at least one holder in front of each discharge Pi station is detected by electromagnetic interaction between a movable element carried by said at least one holder and a fixed element associated with the discharge Pi station; implementation of the detection of the passage is carried out in a very simple way using a fixed element (detector) of the discharge station and a movable element of the holder which is the element to be detected;

the passage of said at least one holder in front of each discharge Pi station is detected by magnetic coupling between a movable element carried by said at least one holder and a fixed element associated with the discharge Pi station; magnetic coupling is one of the possibilities for particularly simple and effective electromagnetic interaction between a detector and an element to be detected;

the movable element carried by said at least one holder is a magnet and the fixed element associated with the discharge station is a Hall effect sensor; these elements form a preferred embodiment because bringing together the movable magnet and the fixed Hall effect sensor produces on the latter a voltage measurable at the terminals of the sensor;

said at least one holder selected to carry out each detection step carries an object. Said at least one object holder which is used for the steps of detecting passage in front of the reference point and in front of each discharge device is adapted to be able to carry an object; thus, the adjustment method according to the invention makes use of existing elements of the sorting line of the system for packaging such objects and, in this case, uses one of the object holders which is used for sorting these objects, subject to a few structural modifications which do not compromise its use as an object holder. Moreover, there is nothing to prevent said at least one object holder which is used for the passage detection steps from carrying an object or not transporting any object;

the adjustment of at least one parameter is carried out during adjustment operations implemented on the sorting line prior to object sorting operations; advantageously, the determination of the distances may be carried out during the adjustment operations, thus avoiding the need to interrupt normal operation of the sorting line to carry out these measurements. However, there is nothing to prevent the operations for adjustment of the sorting line from being carried out during its operation for the purpose of sorting objects. The adjustment of at least one parameter may be performed in real time during object sorting operations;

each holder is formed by two diabolos arranged one behind the other on the sorting line in the direction of forward travel, the two diabolos being adjacent to one another in such a way as to define between them a housing for receiving the object to be carried, each diabolo comprising two portions arranged transversely with respect to the object sorting line and each formed by a cone mounted freely rotatably, the apexes of the two cones facing one another; such a holder structure is particularly suitable for object holders and may be easily used for the implementation of the invention. Other types of holder are possible. They may be, for example, holders in the form of bowls, each bowl having a size allowing it to receive an object, each object being able to be ejected from the bowl by pivoting/overturning the bowl. They may be, for example, holders in the form of a hand-like conveyor cradle, each object conveyed by a conveyor cradle being capable of being released from the conveyor cradle by pivoting the conveyor cradle and/or by pivoting fingers forming said conveyor cradle. There is nothing to prevent the object sorting line from comprising a conveyor belt forming a plurality of holders for said objects and means for discharging said objects from these holders. For example, it may be a belt with studs adapted to hold the objects in place on said belt as the conveyor moves;

the objects conveyed in order to be packaged belong to the group of fruit and vegetables. They may be any type of fruit and/or vegetable that is capable of withstanding such sorting operations. In some embodiments of a method according to the invention, the objects may be berries. In these embodiments, the objects are objects of small dimensions or of small size, such as for example blueberries or cherries, that is to say having dimensions and a weight adapted to allow the objects to be discharged in an object discharge station by a flow of air emitted by a nozzle of the discharge station. However, there is nothing to prevent the method according to the invention from being applicable to a line for sorting larger objects, for example apples, oranges, etc. All that is required is to adapt the holders and to provide means for removing the objects from the sorting line which are suitable for these objects.

In a method according to the invention, the passage of said at least one holder in front of a reference point located along the sorting line is detected. The reference point is a fixed point of the sorting line, the position of which on the sorting line is fixed and predetermined. In a method according to the invention, the passage of said at least one holder in front of the reference point is detected by acquisition and analysis of images of said at least one holder, said at least one holder being provided with a pattern that can be identified by image acquisition and analysis means of the sorting line. The reference point of the sorting line is equipped with a device for detecting the passage of said at least one holder in front of the reference point of the sorting line. The passage of said at least one object holder in front of the reference point is detected by any means, said at least one object holder being provided with an identifier that can be identified by the detection device. The passage of said at least one object holder in front of the reference point may be detected by electromagnetic interaction between the fixed detection device and said at least one object holder moving on the sorting line when said at least one object holder passes in front of the reference point; there is thus no contact between the object holder and the detection device, and the detection of passage is carried out automatically as the holder advances along the line, when it reaches the reference point. The fixed detection device may be equipped with a Hall effect sensor, said at least one movable object holder being equipped with a magnet.

In some embodiments of a method according to the invention, where the device for detecting the passage of said at least one holder in front of the reference point of the sorting line is an image acquisition and analysis device, the passage of said at least one holder in front of the reference point located along the sorting line is detected by means of the image acquisition and analysis device, in particular by means of an image acquisition and analysis device comprising a camera, this device being fixed with respect to the sorting line. In these embodiments, said object holder may have a pattern—in particular a colored pattern—that can be identified. In these embodiments, the passage of said at least one holder in front of the reference point is detected by acquisition and analysis of images of said at least one holder, said at least one holder being provided with a pattern that can be identified by image acquisition and analysis means of the sorting line. However, there is nothing to prevent the passage of said at least one holder in front of the reference point from being detected by any other means suitable for this purpose.

Advantageously, for the implementation of a method for adjusting at least one parameter of a sorting line according to the invention, use is made, to detect the passage of said at least one holder in front of the reference point, of the device of the sorting line for analyzing the objects conveyed by the sorting line for the purpose of determining the sorting criterion of the objects conveyed by the sorting line and sorting said objects. The distance Di traveled by said object holder between the reference point equipped with the image acquisition and analysis device and each discharge station is thus precisely determined.

The present invention also relates to a system for sorting objects belonging to the group of fruit and vegetables, comprising at least one sorting line equipped with a plurality of object holders, each holder being intended to carry an object, the object holders being driven such that they move in a longitudinal direction of forward travel of the sorting line, the sorting line comprising:

- a reference point in front of which each of said object holders is intended to pass, and;
- a plurality of discharge Pi stations arranged successively along the sorting line and downstream of the reference point in the direction of forward travel of the holders;

each discharge Pi station being intended to discharge objects each carried by their holder and being located at a distance Di with respect to the reference point;

the system being characterized in that it comprises:

- a device for detecting the passage of at least one object holder in front of the reference point;
- a device for detecting the passage of said at least one object holder in front of each discharge station;
- a computer device configured to determine the various longitudinal distances Di between the discharge stations of the plurality of discharge Pi stations and the reference point on the basis of detections of passages of said at least one object holder in front of the reference point and in front of each discharge station and the speed V at which said at least one object holder is driven.

The same advantages as set out above in relation to the method briefly described also apply to the aforementioned system. Furthermore, the sorting system which is conventionally used for sorting fruit and/or vegetables into batches requires few modifications for it to be able to implement the invention. All that is required is to provide and integrate devices for detecting passage in front of the reference point and in front of each discharge station and a computer device comprising a data processing unit, adapted to receive passage detection data and to calculate each distance Di. Thus, the computer device is capable of transmitting instructions for discharging an object from its object holder at the precise moment of its passage in front of the station for discharging objects having the same sorting criterion and grouping these objects with the same sorting criterion into batches. In a preferred embodiment, only certain modifications are to be made structurally to an object holder and to the various discharge stations and certain software modifications to the data processing unit (which determines the distances Di) so as to implement the invention. Preferably, the device for detecting the passage of at least one object holder in front of the reference point may simply take the form of a camera which itself forms the reference point of the sorting line.

According to other possible features:

each device for detecting the passage of said at least one object holder in front of each discharge Pi station comprises a movable element carried by said at least one holder and a fixed element associated with the discharge station, which are both capable of interacting with one another, with or without contact. The movable element carried by said at least one holder may interact mechanically by contact with the fixed element associated with the discharge station;

each device for detecting the passage of said at least one object holder in front of each discharge Pi station comprises a movable element carried by said at least one holder and a fixed element associated with the discharge station, which are both capable of interacting with one another by electromagnetic interaction—by detection of a magnetic field produced by the movable element—when the movable element passes in front of the fixed element in order to detect the passage of said at least one object holder in front of the discharge station. In some embodiments, the movable element carried by said at least one holder comprises at least one magnet and the fixed element associated with the discharge station comprises at least one Hall effect sensor;

each device for detecting the passage of said at least one object holder in front of each discharge Pi station comprises a movable element carried by said at least one holder and a fixed element associated with the discharge station, which are both capable of communicating with one another by radio frequency when the movable element passes in front of the fixed element in order to detect the passage of said at least one object holder in front of the discharge station. In some embodiments, the movable element carried by said at least one holder comprises at least one electronic component capable of transmitting data by radio frequency—in particular a microcircuit, or chip or RFID tag—and the fixed element associated with the discharge station comprises at least one electronic component capable of receiving data by radio frequency—in particular an RFID reader;

each device for detecting the passage of said at least one object holder in front of each discharge station comprises:

a fixed element associated with the discharge station, said fixed element is a photoelectric cell comprising an emitter that emits a beam of at least one electromagnetic wave and a sensor that detects said at least one electromagnetic wave placed facing said emitter; and a movable element carried by said at least one holder, the movable element being arranged to interrupt the transmission of the beam between the emitter and the sensor;

the beam of said at least one electromagnetic wave being interrupted when the movable element is interposed between the emitter and the sensor of the photoelectric cell. The fixed element associated with the discharge station comprises at least one photoelectric cell comprising an emitter that emits a beam of at least one electromagnetic wave and a photosensitive sensor, both arranged such that the movable element carried by said at least one holder intercepts said beam owing to the passage of said at least one holder in front of the discharge station;

the fixed element associated with the discharge station comprises at least one device for acquiring at least one image of said at least one holder passing in front of the discharge station and the object sorting system comprises a unit for analyzing and processing said images adapted to detect the passage of said at least one holder in front of the discharge station;

each device for detecting the passage of said at least one object holder in front of each discharge station comprises a movable element carried by said at least one holder and a fixed element associated with the discharge station, the movable element having a particular color and the fixed element comprising a colorimeter;

there is nothing to prevent provision being made for each device for detecting the passage of said at least one object holder in front of each discharge station to comprise a movable element carried by said at least one holder and a fixed element associated with the discharge station, the movable element comprising a heat source and the fixed element comprising an infrared (IR) wave detector;

the device for detecting the passage of said at least one object holder in front of the reference point may be of any kind. It may comprise a movable element carried by said at least one holder and a fixed element associated with the reference point, the movable element and the fixed element being capable of interacting with one another by electromagnetic interaction when the movable element passes in front of the fixed element in order to detect the passage of said at least one object holder in front of the fixed reference point. The movable element may have a magnet and the fixed element may include a Hall effect sensor;

the device for detecting the passage of said at least one object holder in front of the reference point may comprise a movable element carried by said at least one holder and a fixed element associated with the reference point, the movable element and the fixed element being capable of interacting with one another by radio frequency when the movable element passes in front of the fixed element in order to detect the passage of said at least one object holder in front of the fixed reference point. The movable element may have an identifier—in particular an RFID identifier—and the fixed element may comprise an RFID identifier reader;

in some advantageous embodiments, the device for detecting the passage of said at least one object holder in front of the reference point comprises a fixed device—in particular a fixed camera—for acquiring at least one image of said at least one holder passing in front of the reference point, arranged along the sorting line and forming the reference point, the image acquisition device—in particular the camera—being adapted to determine the passage of said at least one object holder in front of the reference point. Advantageously, said at least one object holder has a colored pattern and the fixed camera is adapted to be able to perform a colorimetric analysis of said at least one object holder;

there is nothing to prevent provision being made for the device for detecting the passage of said at least one object holder in front of the reference point to comprise an infrared (IR) wave detector arranged along the sorting line, forming the reference point and adapted to detect the passage of said at least one object holder carrying a heat source in front of the reference point;

in some advantageous embodiments, each holder is formed by two diabolos arranged one behind the other on the sorting line in the direction of forward travel, the two diabolos being positioned adjacent to one another so as to define between them a housing for receiving the object to be carried, each diabolo comprising two portions arranged transversely and each formed by a cone mounted freely rotatably, the apexes of the two cones facing one another;

the system comprises a computer device comprising a unit for processing data and for determining the distances Di.

The invention also relates to a facility for packaging objects belonging to the group of fruit and vegetables, of the type comprising a system for sorting objects according to the invention.

The invention also relates to a method for adjusting at least one parameter of a line for sorting objects belonging to the group of fruit and vegetables, a system for sorting objects and a facility for packaging such objects characterized, in combination or otherwise, by all or some of the features mentioned above or below. Regardless of the formal presentation given, unless expressly stated to the contrary, the various features mentioned above or below should not be considered as closely or inextricably linked to one another, and the invention may relate to only one of these structural or functional features, or to only some of these structural or functional features, or to only part of one of these structural or functional features, or to any group, combination or juxtaposition of all or some of these structural or functional features.

BRIEF DESCRIPTION OF THE DRAWINGS

Other aims, features and advantages of the invention will become apparent on reading the following non-limiting description of some possible embodiments, which refers to the appended drawings, in which FIG. 1 is a simplified perspective view of a line for sorting objects chosen from the group made up of fruit and vegetables, in a first state of forward travel of the line for sorting said objects;

FIG. 2 is a simplified perspective view of the sorting line shown in FIG. 1, in a second state of forward travel of the sorting line;

FIG. 3 is a simplified perspective view of the sorting line shown in FIG. 1 and FIG. 2, in a third state of forward travel of the sorting line;

DETAILED DESCRIPTION OF EMBODIMENT(S)

Figure 4:
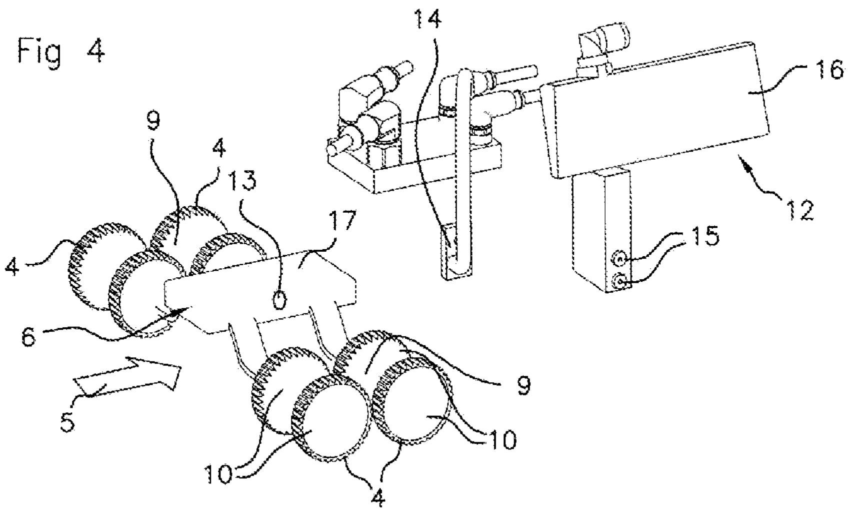
FIG. 4 is a simplified perspective view of an object holder of an object sorting line in a position upstream of an object discharge station of a sorting line according to one embodiment of the invention.

A simplified view of a line 1 for sorting objects in a system for packaging such objects belonging to the group made up of fruit and vegetables, in a first state of forward travel of the line for sorting said objects, is depicted in FIG. 1. The sorting line 1 comprises a conveyor 2 comprising a chain 3 driven such that it moves in a longitudinal direction 5 of movement of the conveyor 2, and a plurality of adjacent diabolos 4, rigidly secured to the chain 3 and driven in movement by the chain 3. Two successive diabolos 4 arranged one behind the other on the conveyor 2 of the sorting line 1 define between them a housing 9 for receiving an object 7 to be carried, selected from the group of fruit and vegetables, and form a holder 6 for said object. Each diabolo 4 comprises two portions 10 arranged transversely with respect to the object sorting line and each formed by a cone mounted freely rotatably, the apexes of the two cones facing one another. On the sorting line shown in FIG. 1, a single object 7 has been shown for the sole purpose of simplifying the drawing. In fact, during an object sorting phase, each holder 6—or at least a majority of holders 6—is occupied by an object 7, the rate of running of the chain 3 and of each holder 6 possibly reaching a value of 3000 increments (replacement of a given holder by the immediately adjacent upstream holder) per minute. The sorting line 1 includes a reference point 11 which is fixed with respect to the sorting line 1. It also includes at least one device 8 for measuring at least one value representative of each object passing in front of the reference point 11 for the purposes of sorting said objects. At least one detection device 8 may be a camera adapted to create a digital image of each object 7 passing by the reference point 11. There is nothing to prevent at least one measuring device 8 from being, for example, a device for weighing each object, for determining the weight of the object and sorting the object. The object packaging system comprises a computer device adapted to receive each datum provided by the measuring device 8, to analyze each datum according to at least one object sorting criterion and to determine the discharge station at which the object 7 analyzed by the computer device is to be discharged. The computer device determines the period of time required for the object 7 analyzed to travel the distance Di between the reference point 11 and the discharge station at which the object 7 is to be discharged. In some embodiments in which the measuring device 8 is a camera, the computer device is adapted to receive each digital image created by the measuring device 8, to analyze each digital image according to at least one object sorting criterion and to determine the discharge station at which the object 7 analyzed by the computer device is to be discharged, so as to form a batch of objects ejected from the sorting line at the same discharge station and grouped into batches of objects with the same sorting criterion.

A simplified view of the line 1 for sorting objects in a system for packaging such objects belonging to the group made up of fruit and vegetables, in a second state of forward travel of the line 1 for sorting said objects, is depicted in FIG. 2. In FIG. 2, the object 7 has reached a first discharge station 12 located at a distance from the reference point 11, within a period not corresponding to the distance from the reference point 11 and to the period calculated by the computer device for this object, which is why the object 7 is not discharged from the sorting line 1 at the discharge station 12.

A simplified view of the line 1 for sorting objects in a system for packaging such objects belonging to the group made up of fruit and vegetables, in a third state of forward travel of the line 1 for sorting said objects, is depicted in FIG. 3. In FIG. 3, the object 7 has reached a second discharge station 12' located at a distance from the reference point 11, within a period corresponding to the distance from the reference point 11 and to the period calculated by the computer device for this object to be discharged from the sorting line 1. Within this period, the computer device activates the discharge device, whereby the object 7 is discharged from the sorting line 1 at the discharge station 12'. This results in all the objects meeting the same sorting criterion being grouped into a batch by ejection of these objects at the same discharge station.

However, owing for example to maintenance on the object packaging system and/or on the sorting line 1, it may be that the position of the reference point 11 of the sorting line and/or the position of at least one discharge station (12,12') is modified such that the distances Di between the reference point 11 and each discharge Pi station 12 are also modified. It is therefore necessary to adjust the parameters of the object sorting line 1 taking into account these modifications.

In a method according to the invention for adjusting at least one parameter of a line for sorting objects in a packaging system for such objects belonging to the group of fruit and vegetables, each object holder of the sorting line is driven such that it moves in a longitudinal direction of forward travel of the sorting line and at a predetermined speed V by means of a chain of the object conveyor. The adjustment method according to the invention is implemented prior to any sorting step, the object holders of the sorting line not holding any conveyed objects. However, there is nothing to prevent the adjustment method according to the invention from being implemented when at least one object holder part is conveying objects.

In a method according to the invention, each object holder, driven such that it moves at the predetermined speed V, passes in front of a reference point equipped with a device for detecting the passage of at least one object holder. The device for detecting the passage of an object holder may be a detector that detects electromagnetic interaction between the fixed detection device located at the fixed reference point and said at least one holder moving on the sorting line when said at least one object holder passes in front of the reference point. Said at least one object holder may be provided with a magnet and the detection device may be a Hall effect sensor.

In some advantageous embodiments, the device for detecting the passage of an object holder in front of a fixed reference point of an object sorting line may be a fixed image acquisition device located at the fixed reference point, and said at least one holder moving on the sorting line may be an object holder provided with an identifier which can be identified from images created by the fixed image acquisition device. For example, the object holder may be a colored holder, being a different color to the other holders on the sorting line, the fixed image acquisition device being adapted to acquire a plurality of digital images making it possible to determine, by analysis of these digital images, the moment at which the colored holder passes in front of the reference point. As the fixed image acquisition device is a camera, it transmits the images of the plurality of images to a computer unit (computer) 20 for controlling the system, comprising at least one digital image analysis processor for determining a time to at which said object holder passes in front of the reference point of the object sorting line.

An object holder 6 moving in a longitudinal direction 5 of forward travel of the sorting line and approaching a discharge station 12 from upstream is shown in FIG. 4. In this FIG. 4, and in the following FIGS. 5 and 6, the chain of the conveyor and the plurality of object holders are not depicted in full for the sake of simplification of the disclosure and clarity of the drawings. The object holder 6, which is movable with respect to the sorting line, is made up of a central body 17 provided with two pairs of diabolos 4 arranged laterally with respect to the longitudinal direction of movement of the object holder, each pair of diabolos 4 forming a lateral housing 9 intended to receive an object. The discharge station 12, which is fixed with respect to the sorting line, comprises on the one hand a fixed element integrally associated with the discharge station 12, the fixed element being provided with a sensor 14 selected so as to be able to detect the passage of the object holder 6 in front of the discharge station 12, by detecting electromagnetic interaction between the magnet 13 of the holder and the Hall effect sensor 14 of the detection station 12. In the position in which the object holder 6 is approaching from upstream of a discharge station 12, as shown in FIG. 4, the magnet 13 of the holder is at a distance from the Hall effect sensor 14 and the advance of the object holder 6 along the sorting line 1 is not detected by the Hall effect sensor 14.

Figure 5:
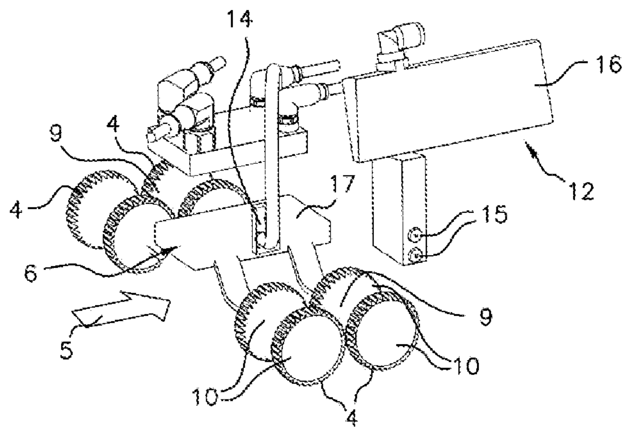
FIG. 5 is a simplified perspective view of an object holder of an object sorting line in a position for detecting the passage of said holder in the object discharge station of the sorting line shown in FIG. 4.

In the position in which the object holder 6 is moving in a longitudinal direction 5 of forward travel of the sorting line 1, as shown in FIG. 5, the magnet 13 of the object holder 6 lies at a short distance from the Hall effect sensor 14 of the discharge station 12. The voltage value at the terminals of the Hall effect sensor 14 is at a maximum and corresponds to the passage of the object holder 6 as close as possible to the Hall effect sensor 14. The Hall effect sensor 14 transmits, to an electronic card 16 ("Air Machine Output Card, CSMA") of the discharge station, the data on the electrical voltage measured at the terminals of the Hall effect sensor 14. The maximum voltage value determined by the electronic card 16 corresponding to the moment of passage of the magnet 13 in front of, as close as possible to and opposite the sensor 14. The information concerning the maximum voltage value is transmitted to an electronic card 18 ("Air Machine Output Management Card, CGSMA") by each CSMA electronic card 16 associated with a discharge station 12. The processor of the "CGSMA" electronic card 18 calculates, from the data received from the fixed image acquisition device of the reference point and the data received from each "CSMA" electronic card 16, the value of the period $t_n$-$t_0$ elapsed between the moment ($t_0$) of passage of the object holder in front of the reference point and the moment ($t_n$) of passage of the object holder in front of the discharge station "n". The CGSMA electronic card 18 centralizes the information transmitted by the CSMA electronic card 16 and transmits these data to a control unit 20 of the object packaging system via an interface 19 comprising a return electronic control card. Taking into account the predetermined value of the speed V of movement of the object holders 6 on the sorting line 1, the control unit 20 calculates the distances Di between the reference point 11 of the sorting line 1 and each discharge Pi station 12 of the object sorting line 1. From the values Di determined during the method according to the invention for adjusting at least one parameter of a line 1 for sorting objects 7 in a system for packaging such objects belonging to the group of fruit and vegetables, the control unit 20 orders, during object sorting operations, the activation of the object discharge means of the discharge station 12 corresponding to the sorting criterion of the object carried by the object holder, as the object carried by the object holder passes in front of the discharge nozzles 15.

Figure 6:
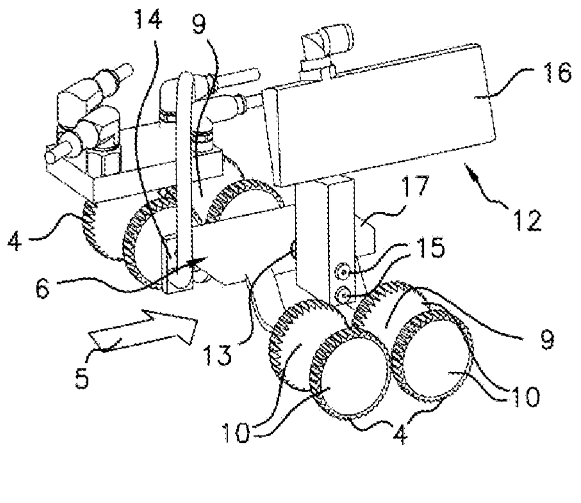
FIG. 6 is a simplified perspective view of an object holder of an object sorting line in the object discharge position in the object discharge station of the sorting line shown in FIG. 4 and FIG. 5.

In the position of the object holder 6 moving in the longitudinal direction 5 of forward travel of the sorting line as shown in FIG. 6, the object holder 6 is shown in a moved-away position downstream of the discharge station 12, the object holder 6 moving in the direction of a different downstream discharge station on the sorting line. In the position of the object holder 6 shown in FIG. 6, the distance between the magnet 13 of the object holder 6 (movable) and the Hall effect sensor 14 of the discharge station 12 (fixed) is such that the magnet 13 is no longer detected by the sensor 14. On the other hand, the discharge nozzles 15 of the discharge station 12 are positioned such that an air flow that can be produced by the discharge station 12 is directed onto the housing 9 of the object holder 6 and is adapted to be able to discharge an object carried by the object holder 6.

Figure 7:
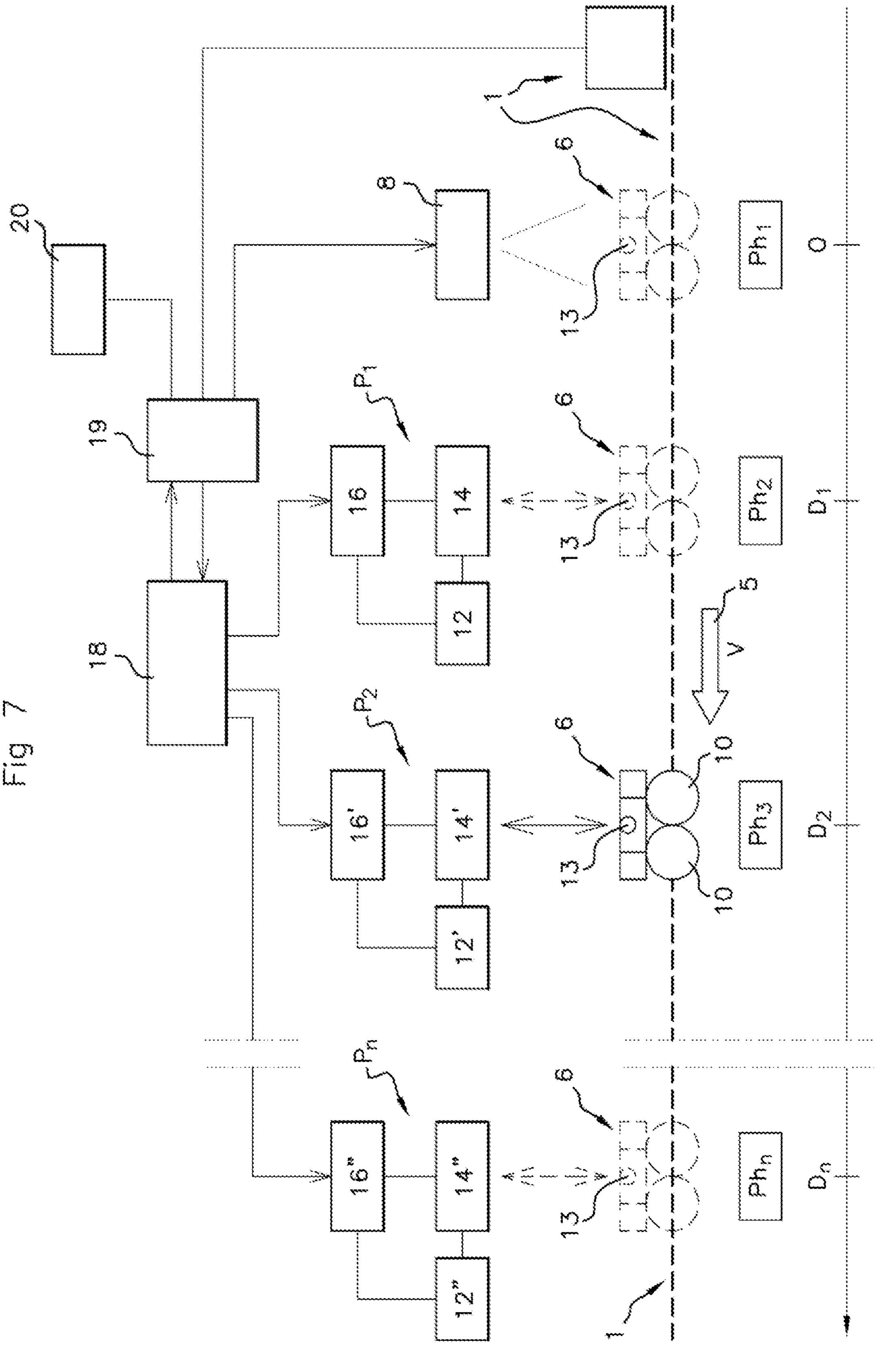
FIG. 7 schematically depicts an object sorting line according to the invention.

A method for adjusting at least one parameter of a line 1 for sorting objects in a system for packaging such objects belonging to the group of fruit and vegetables is shown in FIG. 7, in which the sorting line 1 is depicted schematically by a straight dotted line. An object holder 6 devoid of any transported object is shown in different successive positions along the sorting line 1, moving at a speed V in the longitudinal direction 5 of forward travel of the sorting line 1. The object holder 6 has a magnet 13 arranged such that it can interact with the Hall effect sensor 14' coupled to the discharge station 12. During the implementation of the method according to the invention for adjusting at least one parameter of the line 1 for sorting objects in a system for packaging such objects belonging to the group of fruit and vegetables, object sorting is not underway. However, there is nothing to prevent the adjustment method according to the invention from being implemented during an object sorting operation, with the object holders holding objects. At least one parameter is then adjusted in real time.

During a first phase ($Ph_1$) of the method for adjusting at least one parameter of an object sorting line according to the invention, with an object holder, referred to as an adjustment holder 6, approaching the reference point 11 of the object sorting line 1, the device 8 for detecting the passage of said adjustment holder 6 in front of the reference point 11 generates digital data representative of the position of said adjustment holder 6 with respect to the reference point 11. These digital data are transmitted to an electronic card 18 provided with a processor and software 19 for analyzing these digital data, which determines the moment to of passage of said adjustment holder opposite the reference point 11. The moment to of passage of said adjustment holder opposite the reference point 11 is communicated to a computer control unit 20 of the object packaging system, indicating that said holder is at the reference point 11, denoted “O” in FIG. 7. The detection device 8 may be a camera adapted to create a plurality of digital images of said adjustment holder 6 moving along the sorting line 1. In one particularly advantageous embodiment, the device 8 for detecting the passage of said adjustment holder 6 is a device also allowing an analysis of each object carried by the object holders of the object sorting line, with a view to sorting them according to a given sorting criterion. Thus, the device, in particular the camera, for analyzing the objects carried by the object holders with a view to sorting them is used as a device 8 for detecting the passage of said adjustment holder 6 at the reference point 11 of the sorting line 1. Said adjustment holder 6 is provided with at least one identifier that can be identified contactlessly by the detection device 8.

At least one identifier of said adjustment holder 6 may be a magnetic identifier, the device 8 for detecting the passage of said adjustment holder 6 comprising a magnetic reader. In particular, at least one identifier of said adjustment holder 6 may be a magnet, the device 8 for detecting the passage of said adjustment holder 6 comprising a Hall effect sensor.

At least one identifier of said adjustment holder 6 may be an electronic component capable of transmitting data by radio frequency, in particular microcircuits or RFID tags, the device 8 for detecting the passage of said adjustment holder 6 comprising at least one electronic reader adapted to receive data by radio frequency, in particular comprising at least one RFID reader.

At least one identifier of said adjustment holder 6 may be an optically-readable code component, in particular a bar code component, a two-dimensional code component such as a QR code or a three-dimensional code, the device 8 for detecting the passage of said adjustment holder 6 comprising at least one optical reader, in particular a bar code reader, a QR code reader, a three-dimensional code reader, such as an optical reader comprising a high-definition matrix sensor.

At least one identifier may also be a colored pattern positioned on said adjustment holder, the device 8 for detecting the passage of said adjustment holder 6 comprising a colorimeter and/or a camera adapted to detect the presence of the colored pattern on said adjustment holder 6 at the reference point 11 of the sorting line 1.

During a second phase ($Ph_2$) of the method for adjusting at least one parameter of an object sorting line according to the invention, with said adjustment holder 6 approaching a first object discharge station $P_1$ of the object sorting line 1, the Hall effect sensor 14 of the first object discharge station $P_1$ produces digital data representative of the position of the magnet of said adjustment holder 6 with respect to the first discharge station $P_1$. These digital data are collected on an electronic card 16 of the first discharge station $P_1$ and transmitted to an electronic card 18 equipped with a processor and software 19 for analyzing these digital data, which determine the moment $t_1$ of passage of said adjustment holder opposite the first discharge station $P_1$. The moment $t_1$ of passage of said adjustment holder opposite the first discharge station $P_1$ is communicated to a computer control unit 20 of the object packaging system which calculates the time ($t_1$-$t_0$) of travel of said adjustment holder between the reference point 11 and the first discharge station $P_1$ and the distance $D_1$ between the reference point 11 and the first discharge station $P_1$, taking into account the speed V of movement of said adjustment holder on the sorting line 1.

During a third phase ($Ph_3$) of the method for adjusting at least one parameter of an object sorting line according to the invention, with said adjustment holder 6 approaching a second object discharge station $P_2$ of the object sorting line 1, the Hall effect sensor 14 of the second object discharge station $P_2$ produces digital data representative of the position of the magnet of said adjustment holder 6 with respect to the second discharge station $P_2$. These digital data are collected on an electronic card 16' of the second discharge station $P_2$ and transmitted to the electronic card 18 of the object packaging system, which determine the moment $t_2$ of passage of said adjustment holder opposite the second discharge station $P_2$. The moment $t_2$ of passage of said adjustment holder opposite the second discharge station $P_2$ is communicated to the computer control unit 20 of the object packaging system which calculates the time ($t_2$-$t_0$) of travel of said adjustment holder between the reference point 11 and the second discharge station $P_2$ and the distance $D_2$ between the reference point 11 and the second discharge station $P_2$, taking into account the speed V of movement of said adjustment holder on the sorting line 1.

During an nth phase ($Ph_n$) of the method for adjusting at least one parameter of an object sorting line according to the invention, with said adjustment holder 6 approaching an nth object discharge station $P_n$ of the object sorting line 1, the Hall effect sensor 14 of the nth object discharge station $P_n$ produces digital data representative of the position of the magnet of said adjustment holder 6 with respect to the nth discharge station $P_n$. These digital data are collected on an electronic card 16" of the nth discharge station $P_n$ and transmitted to the electronic card 18 of the object packaging system, which determine the moment $t_n$ of passage of said adjustment holder opposite the nth discharge station $P_n$. The moment $t_n$ of passage of said adjustment holder opposite the nth discharge station $P_n$ is communicated to the computer control unit 20 of the object packaging system which calculates the time ($t_n$-$t_0$) of travel of said adjustment holder between the reference point 11 and the nth discharge station $P_n$ and the distance $D_n$ between the reference point 11 and the nth discharge station $P_n$, taking into account the speed V of movement of said adjustment holder on the sorting line 1.

The invention may be subject to numerous variants and applications other than those described above. In particular, it goes without saying that, unless stated to the contrary, the various structural and functional features of each of the embodiments described above should not be considered as combined and/or closely and/or inextricably linked to one another, but conversely as merely juxtaposed. In addition, the structural and/or functional features of the various embodiments described above may be subject, in whole or in part, to any other juxtaposition or any other combination. For example, the number of discharge stations of an object packaging system according to the invention may vary according to the number of different batches of objects to be grouped together.

The invention claimed is:

1. A method for adjusting at least one parameter of a line for sorting objects of a system for packaging such objects belonging to the group of fruit and vegetables, the sorting line conveying a plurality of holders, each holder being intended to carry an object;

wherein the adjustment method comprises the following steps:

- driving at least one holder such that it moves in a longitudinal direction of forward travel of the sorting line;
- detecting the passage of said at least one holder in front of a reference point of the sorting line;
- detecting the passage of said at least one holder in front of each discharge Pi station of a plurality of discharge stations spread along the sorting line, each discharge Pi station being intended to be able to eject, from said at least one holder, an object carried by said at least one holder, as said at least one holder passes in front of said discharge Pi station;
- determining each longitudinal distance Di between each discharge Pi station of the plurality of discharge stations and the reference point, on the basis of data concerning detection of the passage of said at least one holder in front of the reference point and data concerning detection of the passage of said at least one holder in front of each discharge Pi station and the speed V at which said at least one holder is driven on the sorting line.

2. The method as claimed in claim 1, wherein the passage of said at least one holder in front of each discharge Pi station is detected by electromagnetic interaction between the fixed discharge Pi station and said at least one holder moving on the sorting line when said at least one holder passes in front of the discharge Pi station.

3. The method as claimed in claim 2, wherein the passage of said at least one holder in front of each discharge Pi station is detected by electromagnetic interaction between a movable element carried by said at least one holder and a fixed element associated with the discharge Pi station.

4. The method as claimed in claim 3, wherein the passage of said at least one holder in front of each discharge Pi station is detected by magnetic coupling between the movable element carried by said at least one holder and a fixed element associated with the discharge Pi station.

5. The method as claimed in claim 4, wherein the movable element carried by said at least one holder is a magnet and the fixed element associated with the discharge station is a Hall effect sensor.

6. The method as claimed in claim 1, wherein said at least one holder selected to carry out each detection step carries an object.

7. The method as claimed in claim 1, wherein the adjustment of at least one parameter is carried out during adjustment operations implemented on the sorting line prior to object sorting operations.

8. The method as claimed in claim 1, wherein each holder is formed by two diabolos arranged one behind the other on the sorting line in the direction of forward travel, the two diabolos being adjacent to one another in such a way as to define between them a housing for receiving the object to be carried, each diabolo comprising two portions arranged transversely with respect to the object sorting line and each formed by a cone mounted freely rotatably, the apexes of the two cones facing one another.

9. The method as claimed in claim 1, wherein the passage of said at least one holder in front of the reference point is detected by acquisition and analysis of images of said at least one holder, said at least one holder being provided with a pattern that can be identified by image acquisition and analysis means of the sorting line.

10. A system for sorting objects belonging to the group of fruit and vegetables, comprising at least one sorting line equipped with a plurality of holders for said objects, each holder being intended to carry an object and to be driven such that it moves in a longitudinal direction of forward travel of the sorting line, the sorting line comprising:

- a reference point in front of which each of said object holders is intended to pass; and
- a plurality of discharge Pi stations arranged successively along the sorting line and downstream of the reference point in the direction of forward travel of the holders;

each discharge Pi station being intended to discharge one or more objects each carried by their holder and being located at a distance Di with respect to the reference point;

wherein the system further comprises:

- a device for detecting the passage of at least one object holder in front of the reference point;
- a device for detecting the passage of said at least one object holder in front of each discharge Pi station,
- a computer device configured to determine the various longitudinal distances Di between the discharge stations of the plurality of discharge Pi stations and the reference point on the basis of detections of passages of said at least one object holder in front of the reference point and in front of each discharge Pi station and the speed V at which said at least one object holder is driven.

11. The system as claimed in claim 10, wherein each device for detecting the passage of said at least one object holder in front of each discharge Pi station comprises a movable element carried by said at least one holder and a fixed element associated with the discharge Pi station, which are both capable of interacting with one another by electromagnetic interaction when the movable element passes in front of the fixed element in order to detect the passage of said at least one object holder in front of the discharge Pi station.

12. The system as claimed in claim 11, wherein the movable element carried by said at least one holder comprises at least one magnet and the fixed element associated with the discharge station comprises at least one Hall effect sensor.

13. The system as claimed in claim 10, wherein each device for detecting the passage of said at least one object holder in front of each discharge station comprises a movable element carried by said at least one holder and a fixed element associated with the discharge station, which are both capable of communicating with one another by radio frequency when the movable element passes in front of the fixed element in order to detect the passage of said at least one object holder in front of the discharge station, the movable element carried by said at least one holder comprises at least one electronic component capable of transmitting data by radio frequency and the fixed element associated with the discharge station comprises at least one electronic component capable of receiving data by radio frequency.

14. The system as claimed in claim 10, wherein the fixed element associated with the discharge station comprises at least one photoelectric cell comprising an emitter that emits a beam of at least one electromagnetic wave and a photosensitive sensor, both arranged such that the movable element carried by said at least one holder intercepts the beam of said at least one electromagnetic wave owing to the passage of said at least one holder in front of the discharge station.

15. The system as claimed in claim 10, wherein the fixed element associated with the discharge station comprises at least one device for acquiring at least one image of said at least one holder passing in front of the discharge station and in that the object sorting system comprises a unit for analyzing and processing said images adapted to detect the passage of said at least one holder in front of the discharge station.

16. The system as claimed in claim 10, wherein the device for detecting the passage of said at least one object holder in front of the reference point comprises a fixed device for acquiring at least one image of said at least one holder passing in front of the reference point, arranged along a calibration line and forming the reference point.

17. The system as claimed in claim 16, wherein said system comprises a computer device comprising a unit for processing data and for determining the distances Di.

18. The system as claimed in claim 10, wherein each holder is formed by two diabolos arranged one behind the other on a calibration line in the direction of forward travel, the two diabolos being positioned adjacent to one another so as to define between them a housing for receiving the object to be carried, each diabolo comprising two portions arranged transversely and each formed by a cone mounted freely rotatably, the apexes of the two cones facing one another.

19. A facility for packaging objects belonging to the group of fruit and vegetables, of the type comprising a system for sorting objects as claimed in claim 10.

* * * * *